(12) United States Patent
Wang et al.

(10) Patent No.: US 11,677,343 B1
(45) Date of Patent: Jun. 13, 2023

(54) SENSORLESS MOTOR CONTROL AT LOW SPEEDS AND SPEED REVERSALS FOR AERIAL VEHICLES

(71) Applicant: Amazon Technologies, Inc., Seattle, WA (US)

(72) Inventors: Xiaoqi Wang, Bellevue, WA (US); Marco Antonio De Barros Ceze, Seattle, WA (US); Evan Matthew Francis, Monroe, WA (US); Marc Ian Feifel, Seattle, WA (US); Frederic Pierre Lacaux, Kirkland, WA (US); Michael Szmuk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,359

(22) Filed: Mar. 31, 2022

(51) Int. Cl.
*H02P 6/182* (2016.01)
*H02P 21/18* (2016.01)
*B64D 27/24* (2006.01)
*B64D 45/00* (2006.01)

(52) U.S. Cl.
CPC .............. *H02P 6/182* (2013.01); *B64D 27/24* (2013.01); *H02P 21/18* (2016.02); *B64D 2045/0085* (2013.01)

(58) Field of Classification Search
CPC .. H02P 6/182; H02P 21/18; B64D 2045/0085
See application file for complete search history.

(56) References Cited

U.S. PATENT DOCUMENTS

| 11,374,520 B2 * | 6/2022 | Yajurvedi | H02P 29/0241 |
| 2010/0237817 A1 * | 9/2010 | Liu | H02P 21/0007 318/400.34 |
| 2016/0218657 A1 * | 7/2016 | Nondahl | H02P 6/21 |
| 2020/0169204 A1 * | 5/2020 | Lakshmi Narasimha | H02P 21/24 |

FOREIGN PATENT DOCUMENTS

CN 113364375 A * 9/2021

OTHER PUBLICATIONS

Thomas LaBella, "A Smooth Transition Method Between Position Sensorless Control Algorithms of PM Machines", 2011, IEEE, 2544-2551 (Year: 2011).*

* cited by examiner

*Primary Examiner* — Bickey Dhakal
(74) *Attorney, Agent, or Firm* — Athorus, PLLC

(57) ABSTRACT

Systems and methods for sensorless motor control may include a back EMF (electromotive force) observer, an adaptive EMF filter, magnitude compensation, hybrid rotor position and speed determination, rotor position and speed blending, and angle compensation. In order to provide accurate and reliable rotor position and speed estimations for a motor over a wide and varied range of speeds, at low speeds, during speed reversals, and/or in the presence of external forces, loads, or torques, the sensorless motor control may utilize a hybrid rotor position and speed determination that leverages both angle-based and magnitude-based methods. Further, the outputs of the two methods may be blended based on a shaping function to generate a final estimated rotor position and speed. Then, the motor may be more accurately and reliably controlled based on the final estimated rotor position and speed.

20 Claims, 10 Drawing Sheets

SENSORLESS MOTOR CONTROL AT LOW SPEEDS AND SPEED REVERSALS FOR AERIAL VEHICLES

BACKGROUND

Unmanned aerial vehicles ("UAV") are continuing to increase in use. For example, UAVs are often used by hobbyists to obtain aerial images of buildings, landscapes, etc. While there are many beneficial uses of these vehicles, propulsion mechanisms of such vehicles need to be reliably, precisely, and accurately controlled over a wide range of operating parameters, including low speeds and speed reversals, and in the presence of external forces and loads. Accordingly, there is a need for systems and methods to provide reliable, precise, and accurate sensorless motor control over a wide range of operating parameters, as well as in degraded operational states of aerial vehicles.

DETAILED DESCRIPTION

Figure 1:
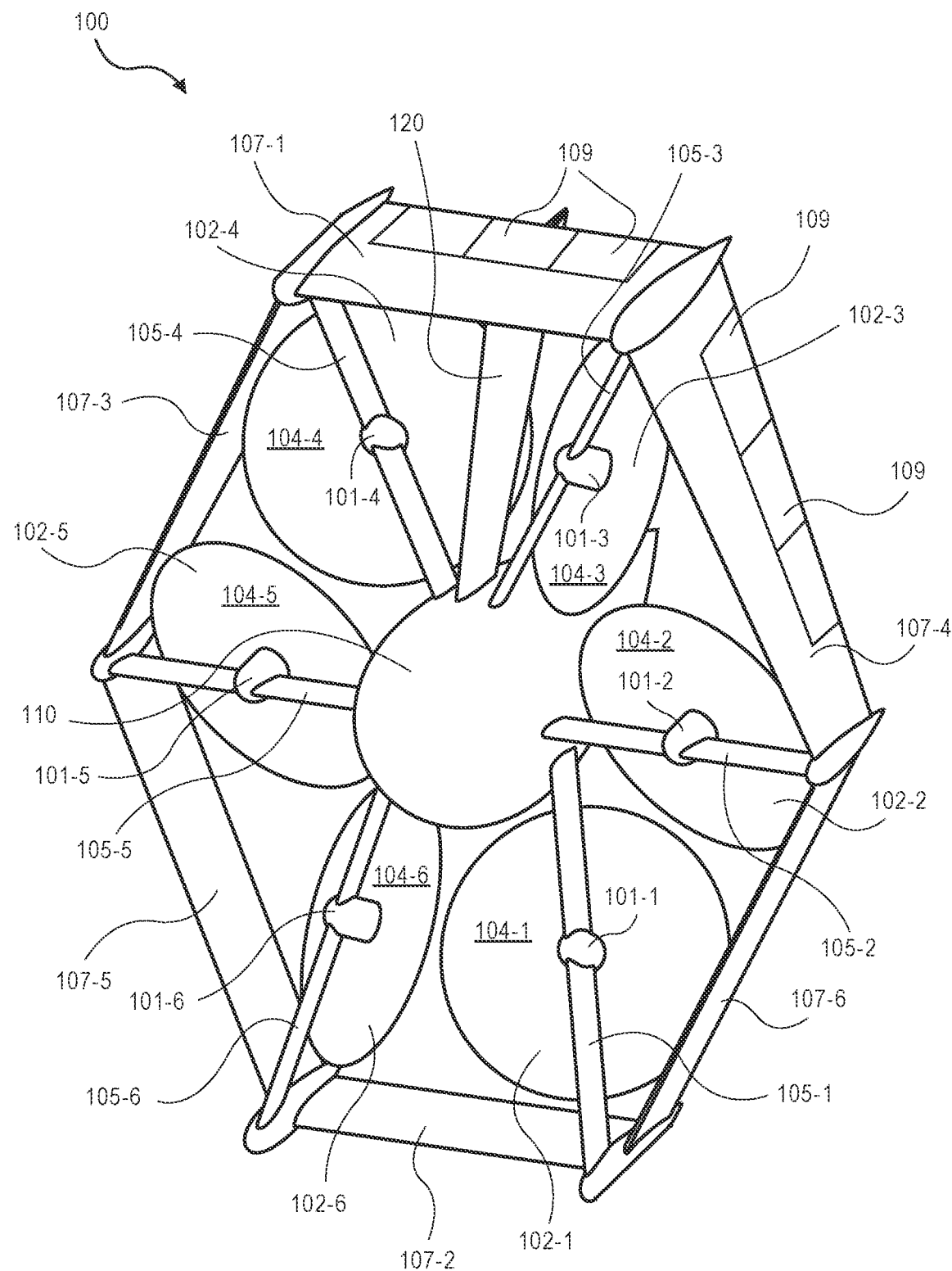
FIGS. 1-4 illustrate various views of an aerial vehicle with a substantially hexagonal shaped ring wing, in accordance with implementations of the present disclosure.

As is set forth in greater detail below, implementations of the present disclosure are directed to systems and methods for sensorless motor control at low speeds and during speed reversals for aerial vehicles. Generally, low speeds and speed reversals described herein may refer to low rotational speeds of motors and speed reversals of motors, in which the motors may be associated with aerial vehicles, or other vehicles, machines, or systems.

Conventional sensorless motor control techniques do not perform well at low speeds or during speed reversals for aerial vehicles and other vehicles, machines, or systems for various reasons. In some examples, low speeds referred to herein may comprise speeds below approximately 1000 rpm, speeds below approximately 500 rpm, speeds between approximately 0 rpm and approximately 300 rpm, speeds between approximately 100 rpm and approximately 200 rpm, and/or other speed ranges. For example, some conventional sensorless motor control techniques may rely upon estimated motor back EMF (electromotive force) for motor control; however, estimated motor back EMF at low speeds or during speed reversals may generally have a low signal-to-noise ratio. As a result, estimations or determinations of rotor positions and speeds using conventional techniques at low speeds or during speed reversals becomes very unreliable and inaccurate.

In addition, conventional sensorless motor control techniques also do not perform well at low speeds or during speed reversals for aerial vehicles and other vehicles, machines, or systems that may operate in the presence of external, variable, or uncontrolled forces, loads, or torques. In some examples, non-negligible torques associated with propulsion mechanisms of aerial vehicles at low speeds or during speed reversals may comprise torques that are approximately 25% of nominal torques, approximately 20% of nominal torques, approximately 15% of nominal torques, approximately 10% of nominal torques, approximately 5% of nominal torques, torques between approximately 0.5 Nm and 3.5 Nm, torques between approximately 1.0 Nm and 3.0 Nm, torques between approximately 1.5 Nm and 2.5 Nm, torques at or above approximately 0.5 Nm, and/or other torque values. For example, forces, loads, or torques caused by other propulsion mechanisms of an aerial vehicle, resulting from various operating parameters or phases of flight of the aerial vehicle, and/or caused by external sources such as wind or weather, may negatively affect estimations or determinations of rotor positions and speeds. As a result, estimations or determinations of rotor positions and speeds using conventional techniques at low speeds or during speed reversals in the presence of external, variable, or uncontrolled forces, loads, or torques become very unreliable and inaccurate.

In example embodiments, the systems and methods for sensorless motor control described herein may perform well at substantially all speed ranges, including at low speeds and during speed reversals. In addition, the systems and methods for sensorless motor control described herein may be robust to external, variable, or uncontrolled forces, loads, or torques that may be applied to or experienced by a motor during operation.

In some example embodiments, the systems and methods for sensorless motor control described herein may be implemented to control one or more propulsion mechanisms of aerial vehicles. For example, the sensorless motor control may enable various types or aspects of flight maneuvers of aerial vehicles, such as greater agility, higher acceleration, improved responsiveness, or other aspects.

In addition, the sensorless motor control may be implemented in degraded operational states of an aerial vehicle, such as when one propulsion mechanism of a plurality of propulsion mechanisms has failed or is otherwise not operational. During such degraded operational states of an aerial vehicle, the sensorless motor control may be implemented for one or more remaining propulsion mechanisms and thereby facilitate reliable and accurate control of the aerial vehicle, over substantially all speeds ranges including at low speeds and during speed reversals, as well as in the presence of external, variable, or uncontrolled forces, loads, or torques.

In example embodiments, the systems and methods for sensorless motor control described herein may comprise a motor back EMF observer, an adaptive EMF filter, magnitude attenuation compensation, hybrid rotor position and speed determination, rotor position and speed blending, and angle or phase delay compensation.

The motor back EMF observer may be configured to receive an input motor line current and to generate an estimated motor back EMF signal. For example, the estimated motor back EMF signal may have a low signal-to-noise ratio, e.g., may comprise a noisy estimated motor back EMF signal.

The adaptive EMF filter may be configured to filter the noisy estimated motor back EMF signal and to generate a filtered estimated motor back EMF signal, e.g., a clean estimated motor back EMF signal. For example, the adaptive EMF filter may have a cutoff frequency that varies based on an operating condition of the motor, e.g., an estimated speed of the motor.

The magnitude attenuation compensation may be configured to receive the clean estimated motor back EMF signal and to compensate the magnitude attenuation of the clean estimated motor back EMF signal that results from the adaptive EMF filter. For example, the amount of compensation may be a known or expected value of magnitude attenuation based on one or more properties of the adaptive EMF filter.

The hybrid rotor position and speed determination may be configured to receive the clean estimated motor back EMF signal, e.g., following magnitude attenuation compensation, and to determine rotor position and speed using two different methods or techniques. For example, an angle-based method may be utilized to determine a first rotor position and speed, and a magnitude-based method may be utilized to determine a second rotor position and speed. Generally, the angle-based method may be more accurate and precise at higher speed ranges, e.g., speed ranges at, around, or above approximately 600 rpm, approximately 700 rpm, approximately 750 rpm, approximately 800 rpm, approximately 900 rpm, and/or other speed values or ranges, and the magnitude-based method may be more accurate at lower speed ranges, e.g., speed ranges at, around, or below approximately 500 rpm, approximately 400 rpm, approximately 300 rpm, approximately 200 rpm, and/or other speed values or ranges.

The rotor position and speed blending may be configured to receive the first and second rotor positions and speeds and to generate combined or final estimated rotor positions and speeds. For example, the first and second rotor positions and speeds may be blended based on a shaping function, e.g., linear interpolation or other shaping functions. Further, the first and second rotor positions and speeds may be blended for substantially all speed ranges, for speed ranges between approximately 200 rpm and 900 rpm, between approximately 300 rpm and 800 rpm, between approximately 300 rpm and 750 rpm, between approximately 400 rpm and 700 rpm, between approximately 500 rpm and 600 rpm, and/or for other speed ranges.

The angle or phase delay compensation may be configured to receive the combined or final estimated rotor positions and speeds and to compensate the phase delay that results from the adaptive EMF filter. For example, the amount of compensation may be a known or expected value of angle or phase delay based on one or more properties of the adaptive EMF filter.

Then, the final estimated rotor positions and speeds, e.g., following angle or phase delay compensation, may be utilized to control one or more motors or propulsion mechanisms associated with aerial vehicles, or other vehicles, machines, or systems.

By using the sensorless motor control systems and methods described herein, one or more motors or propulsion mechanisms associated with various types of vehicles, machines, or systems may be controlled reliably and accurately over substantially all speed ranges, including at low speeds and during speed reversals. Further, the sensorless motor control systems and methods described herein may be robust to external, variable, or uncontrolled forces, loads, or torques that may be applied to or experienced by motors or propulsion mechanisms during operation in various environments. In addition, the sensorless motor control systems and methods described herein may be used to control motors that may operate in direct drive configurations, as well as to control motors that may operate in indirect drive configurations, e.g., in combination with one or more gears, gearboxes, belt drives, or other types of drive transfer components.

FIG. 1 illustrates a view of an aerial vehicle 100 with a ring wing that is substantially hexagonal in shape and that surrounds a plurality of propulsion mechanisms, in accordance with implementations of the present disclosure. The aerial vehicle 100 includes six propulsion mechanisms 102-1, 102-2, 102-3, 102-4, 102-5, and 102-6 spaced about the fuselage 110 of the aerial vehicle 100. While the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween). In addition, the terms propeller and propeller blade are used herein substantially interchangeably with reference to the disclosed implementations, with the understanding that a propeller may comprise one or more propeller blades.

Likewise, while the examples herein describe the propulsion mechanisms being able to generate force in either direction, in some implementations, the propulsion mechanisms may only generate force in a single direction. However, the orientation of the propulsion mechanisms may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the stabilizer fin extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, plastics, metals, aluminum, steel, other materials, or combinations thereof.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion mechanism 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
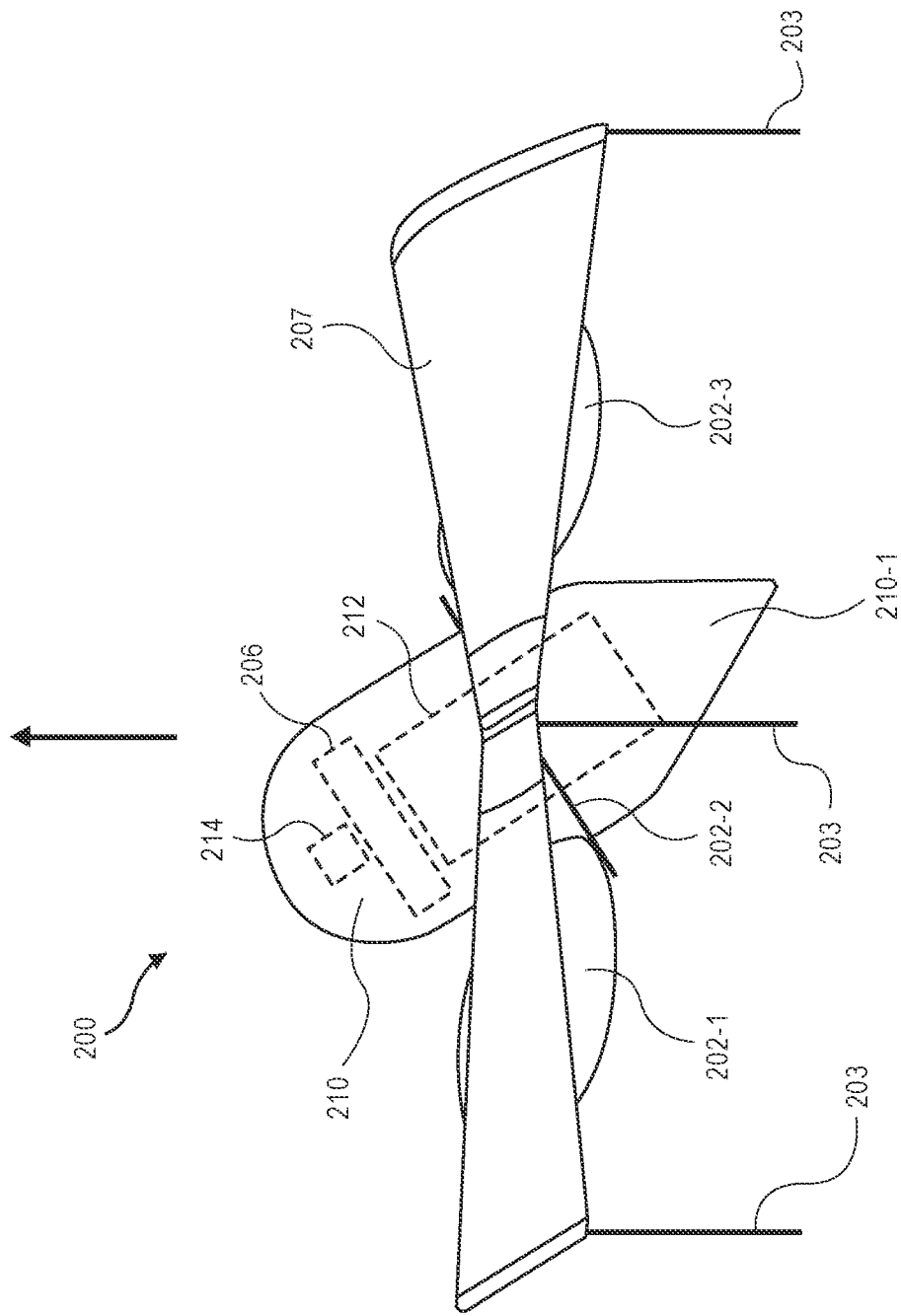

FIG. 2 illustrates a side view of the aerial vehicle 200 oriented for vertical takeoff and landing (VTOL), in accordance with implementations of the present disclosure. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. The aerial vehicle control system 214 is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or combinations thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location, and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery, and the payload may include one or more customer ordered items. For example, a customer may order an item from an electronic commerce website, and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
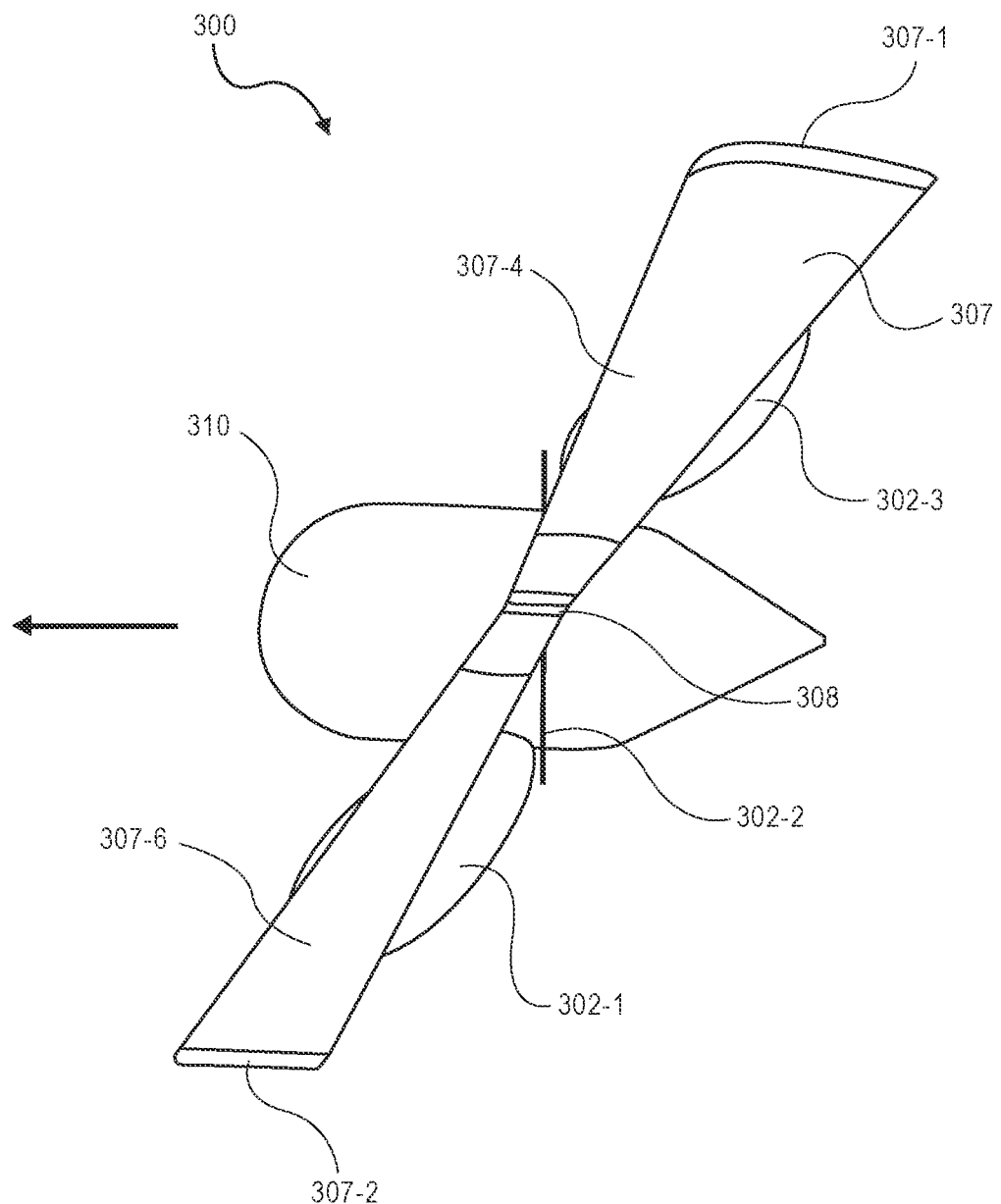

FIG. 3 is a side view of an aerial vehicle 300 with a ring wing 307, in accordance with implementations of the present disclosure. The aerial vehicle 300 corresponds to the aerial vehicle 100 discussed in FIG. 1 and the aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanism 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind, and energy produced from the rotation may be used to charge the power module of the aerial vehicle 300.

The ring wing 307 is angled such that the lower segment 307-2 of the ring wing is positioned ahead of the upper segment 307-1 of the ring wing 307. The leading wing, lower segment 307-2 produces a much higher lift per square inch than the rear wing, upper segment 307-1, and the chord length of the lower segment 307-2 is less than the chord length of the upper segment 307-1. Likewise, as illustrated, the upper segment 307-1 of the ring wing has a different camber than the lower segment 307-2. The chord length and camber transition from that illustrated along the upper segment 307-1 to the lower segment 307-2. In implementations that include one or more stabilizer fins, such as stabilizer fin 120 (FIG. 1), the difference between the chord lengths of the lower segment 307-2 and the upper segment 307-1 may be less and/or the difference between the cambers of the lower segment 307-2 and the upper segment 307-1 may be less.

While the side segments, such as side segment 307-4 and segment 307-6 of the ring wing provide some lift, at the midpoint 308 of each side segment there is minimal lift produced by the ring wing 307. Because there is minimal lift produced at the midpoint 308, the segments may be tapered to reduce the overall weight of the aerial vehicle. In this example, the side segments, such as side segments 307-4 and 307-6, are tapered toward the mid-point but retain some dimension for structural integrity and to operate as a protective barrier around the propulsion mechanisms 302. While the illustrated examples show both side segments 307-4 and 307-6 tapering to a smaller end at the midpoint 308, in other implementations, the taper may be consistent from the larger upper segment 307-1 to the smaller lower segment 307-2.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
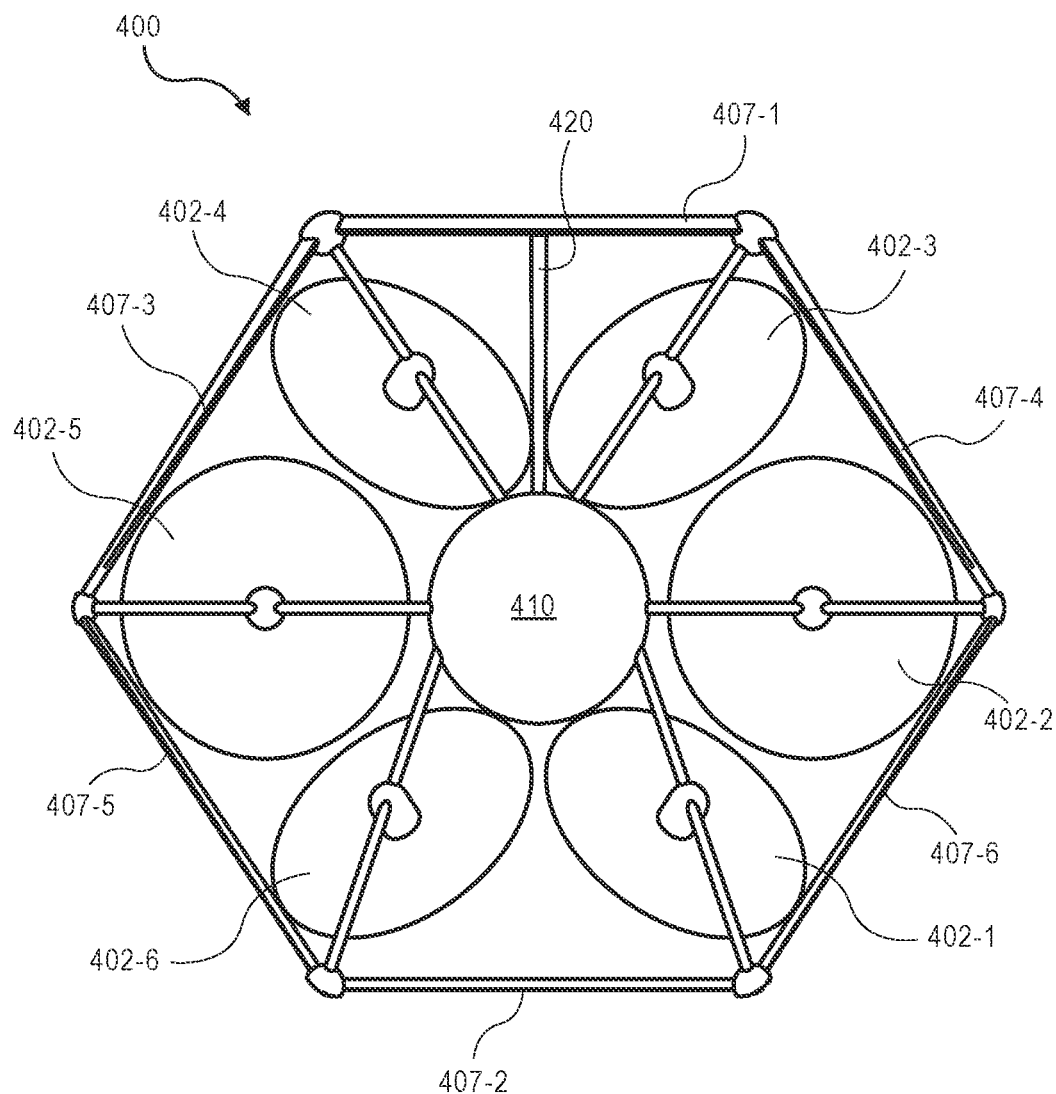

FIG. 4 is a front-on view of an aerial vehicle 400 with a ring wing 407 having a substantially hexagonal shape, in accordance with implementations of the present disclosure. The aerial vehicle 400 corresponds to the aerial vehicle 100 of FIG. 1, the aerial vehicle 200 of FIG. 2, and the aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, one or more ailerons, such as those discussed above with respect to FIG. 1, may be included on the surface of the ring wing and used to control the aerial navigation of the aerial vehicle during horizontal flight. Likewise, one or more stabilizer fins 420 may be included to stabilize the aerial vehicle during horizontal flight.

Figure 5:
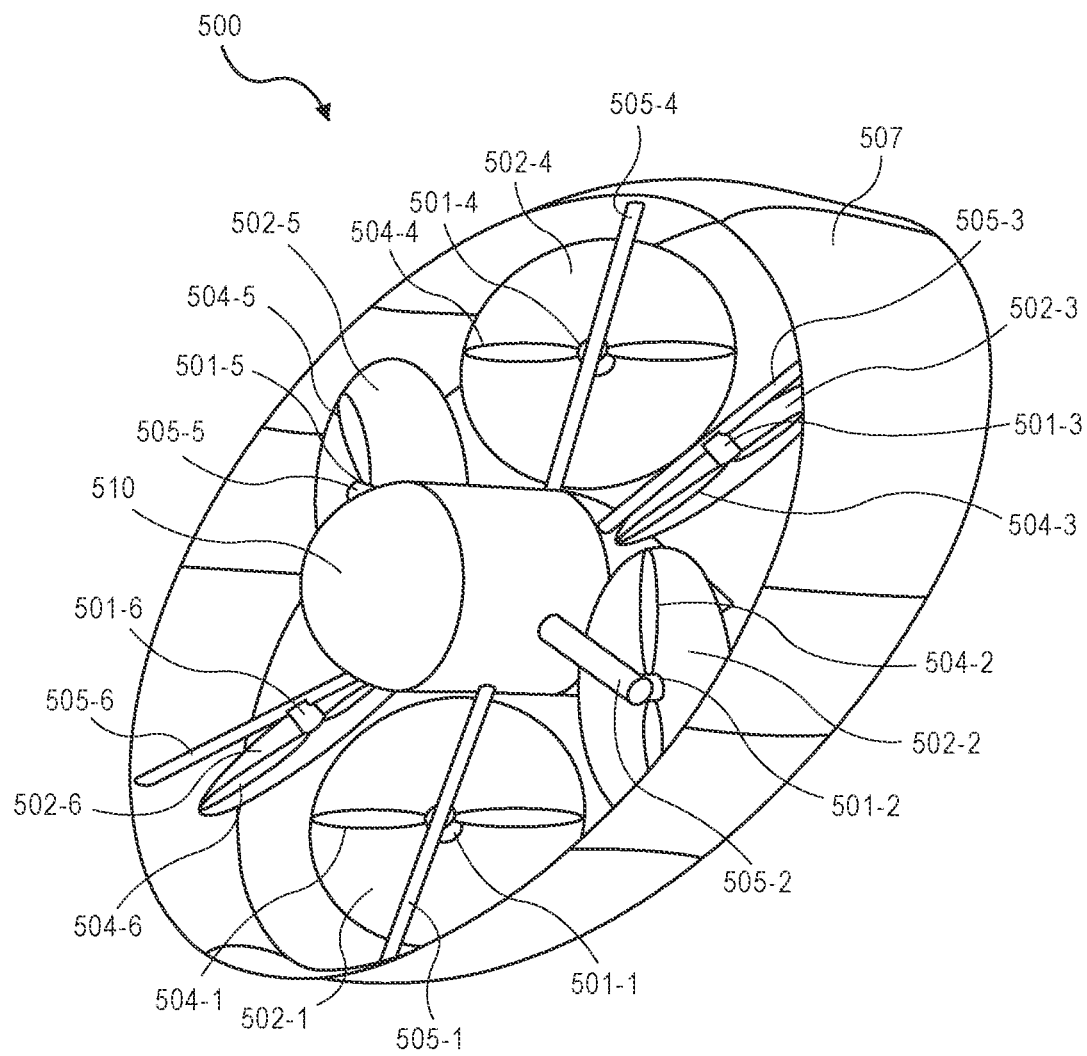
FIG. 5 illustrates a view of an aerial vehicle with a substantially circular shaped ring wing, in accordance with implementations of the present disclosure.

In some implementations, the hexagonal shaped ring wing may decrease manufacturing costs, provide for more stable flight, and provide flatter surfaces upon which control elements, such as ailerons, may be included, in comparison to a substantially circular shaped ring wing as described herein with respect to FIG. 5. Likewise, other components may be coupled to the surface of the ring wing. Other components include, but are not limited to, sensors, imaging elements, range finders, identifying markers, navigation components, such as global positioning satellite antennas, antennas, etc.

As discussed below, to transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5, oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, some pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

FIG. 5 illustrates a view of an aerial vehicle 500 with a ring wing that is substantially cylindrical or circular in shape and that surrounds a plurality of propulsion mechanisms, in accordance with implementations of the present disclosure. The aerial vehicle 500 includes six motors 501-1, 501-2, 501-3, 501-4, 501-5, and 501-6 and corresponding propellers 504-1, 504-2, 504-3, 504-4, 504-5, and 504-6 spaced about the fuselage 510 of the aerial vehicle 500. The propellers 504 may be any form of propeller (e.g., graphite, carbon fiber) and of any size. For example, the propellers may be 10 inch-12-inch diameter carbon fiber propellers.

The form and/or size of some of the propellers may be different than other propellers. Likewise, the motors 501 may be any form of motor, such as a DC brushless motor, and may be of a size sufficient to rotate the corresponding propeller. Likewise, in some implementations, the size and/or type of some of the motors 501 may be different than other motors 501. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel of the aerial vehicle and thus provide significantly less drag if they are not rotating.

Each pair of motors 501 and corresponding propellers 504 will be referred to herein collectively as a propulsion mechanism 502, such as propulsion mechanisms 502-1, 502-2, 502-3, 502-4, 502-5, and 502-6. Likewise, while the example illustrated in FIG. 5 describes the propulsion mechanisms 502 as including motors 501 and propellers 504, in other implementations, other forms of propulsion may be utilized as the propulsion mechanisms 502. For example, one or more of the propulsion mechanisms 502 of the aerial vehicle 500 may utilize fans, jets, turbojets, turbo fans, jet engines, and/or the like to maneuver the aerial vehicle. Generally described, a propulsion mechanism 502, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 502-1, 502-2, 502-3, 502-4, 502-5, and 502-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanism may be adjusted so that the force can be oriented in a positive direction, a negative direction, and/or any other direction.

The aerial vehicle 500 also includes a ring wing 507 having a substantially cylindrical or circular shape that extends around and forms the perimeter of the aerial vehicle 500. In the illustrated example, the ring wing is substantially circular in shape and tapers toward the bottom of the aerial vehicle. The ring wing 507 has an airfoil shape to produce lift when the aerial vehicle is oriented as illustrated in FIG. 5 and moving in a direction that is substantially horizontal. As illustrated, and discussed further below, the ring wing is positioned at an angle with respect to the fuselage 510 such that the lower part of the ring wing acts as a front wing as it is positioned toward the front of the aerial vehicle when oriented as shown and moving in a horizontal direction. The top of the ring wing, which has a longer chord length than the bottom portion of the ring wing 507, is positioned farther back and thus acts as a rear wing.

The ring wing is secured to the fuselage 510 by motor arms 505. In the illustrated example, each of motors arms 505-1, 505-3, 505-4, and 505-6 are coupled to the fuselage 510 at one end, extend from the fuselage 510 and couple to the ring wing 507 at a second end, thereby securing the ring wing 507 to the fuselage 510.

The fuselage 510, motor arms 505, and ring wing 507 of the aerial vehicle 500 may be formed of any one or more suitable materials, such as graphite, carbon fiber, plastics, metals, aluminum, steel, other materials, or combinations thereof.

Each of the propulsion mechanisms 502 are coupled to a respective motor arm 505 (or propulsion mechanism arm) such that the propulsion mechanism 502 is substantially contained within the perimeter of the ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, propulsion mechanisms 502-1, 502-3, 502-4, and 502-6 are coupled at an approximate mid-point of the respective motor arm 505 between the fuselage 510 and the ring wing 507. In other implementations, the propulsion mechanisms (such as propulsion mechanisms 502-2 and 502-5 illustrated in FIG. 5) may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage. In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces, and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as maneuverability propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces, and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

The angle of orientation of each of the propulsion mechanisms 502-1, 502-3, 502-4, and 502-6 may vary for different implementations. Likewise, in some implementations, the offset of the propulsion mechanisms 502-1, 502-3, 502-4, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the second motor arm 505-2 and oriented toward propulsion mechanism 502-3. Finally, propulsion mechanism 502-4 is oriented approximately thirty degrees in the first direction about the fourth motor arm 505-4 and toward propulsion mechanism 502-5. As illustrated, propulsion mechanisms 502-2 and 502-5, which are on opposing sides of the fuselage 110, are aligned and oriented in a same first direction (in this example, horizontal). Propulsion mechanisms 502-3 and 502-6, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Various other features, variations, modifications, and/or example embodiments described herein with respect to FIGS. 1-4 may also be combined and/or incorporated into the aerial vehicle 500 as illustrated in FIG. 5.

While the examples discussed above in FIGS. 1-5 describe a ring wing in either a substantially hexagonal shape (FIGS. 1-4) or a substantially circular shape (FIG. 5), in other implementations, the ring wing may have other shapes. For example, the ring wing may be substantially square, rectangular, pentagonal, octagonal, etc.

During operation of example aerial vehicles, such as those illustrated and described with respect to FIGS. 1-5, the aerial vehicles may implement sensorless motor control methods or techniques described herein. The sensorless motor control methods or techniques may enable various types or aspects of flight maneuvers of aerial vehicles, such as greater agility, higher acceleration, improved responsiveness, or other aspects.

In addition, during operation of example aerial vehicles, such as those illustrated and described with respect to FIGS. 1-5, various types of faults or failure modes may arise that result in degraded operational states of the aerial vehicles. For example, one or more of the propulsion mechanisms may no longer operate normally due to various types of faults, which may be referred to as motor out situations. In order to improve the reliability, safety, and operational capability of the aerial vehicles, the aerial vehicles may implement sensorless motor control methods or techniques described herein in response to such faults in order to maintain flight of the aerial vehicles and/or to navigate toward and land at safe landing locations.

The various types of faults that may result in motor out situations may include damage or loss of function of one or more propellers or propeller blades, damage or loss of function of one or more motors, damage or loss of function of one or more motor controllers that are each in communication with a corresponding motor and propeller, damage or loss of function between one or more motor controllers and a flight controller that is in communication with each of the motor controllers, loss of power or other electrical signals between two or more components of the aerial vehicle, or various other types of faults.

In addition, the various types of faults may be detected in various manners. For example, damage or loss of function of one or more propellers or propeller blades may be detected by comparison of actual values of motor revolutions per minute (rpm) and applied current with expected values of motor rpm and applied current, since a motor rotating with damaged or missing propellers or blades may draw different values of current than expected values while rotating at a particular motor rpm. In addition, damage or loss of function of one or more motors may be detected by comparison of measured rpm versus commanded rpm, or by measurements and/or calculations related to motor efficiency. Further, various faults of one or more propellers, blades, and/or motors may be detected by one or more motor controllers, which may be provided as feedback to the flight controller. Moreover, various faults of one or more motor controllers may be detected by the flight controller.

In further example embodiments, various other types of sensors may be used to detect one or more of the various types of faults that result in motor out situations. For example, the sensors may include imaging devices or cameras that can capture images of portions of propellers, blades, and/or motors, which images may be processed to determine damage or loss of function of one or more components. In addition, the sensors may include inertial measurement units, accelerometers, gyroscopes, or similar types of sensors that may detect changes to flight operations or navigation of the aerial vehicle that may be caused by one or more faults that result in motor out situations. Various other types of sensors may also detect aspects of flight, navigation, movement, or operation of various components of the aerial vehicles to identify one or more faults. Moreover, the various types of faults may be detected by various combinations of methods described herein.

Figure 6:
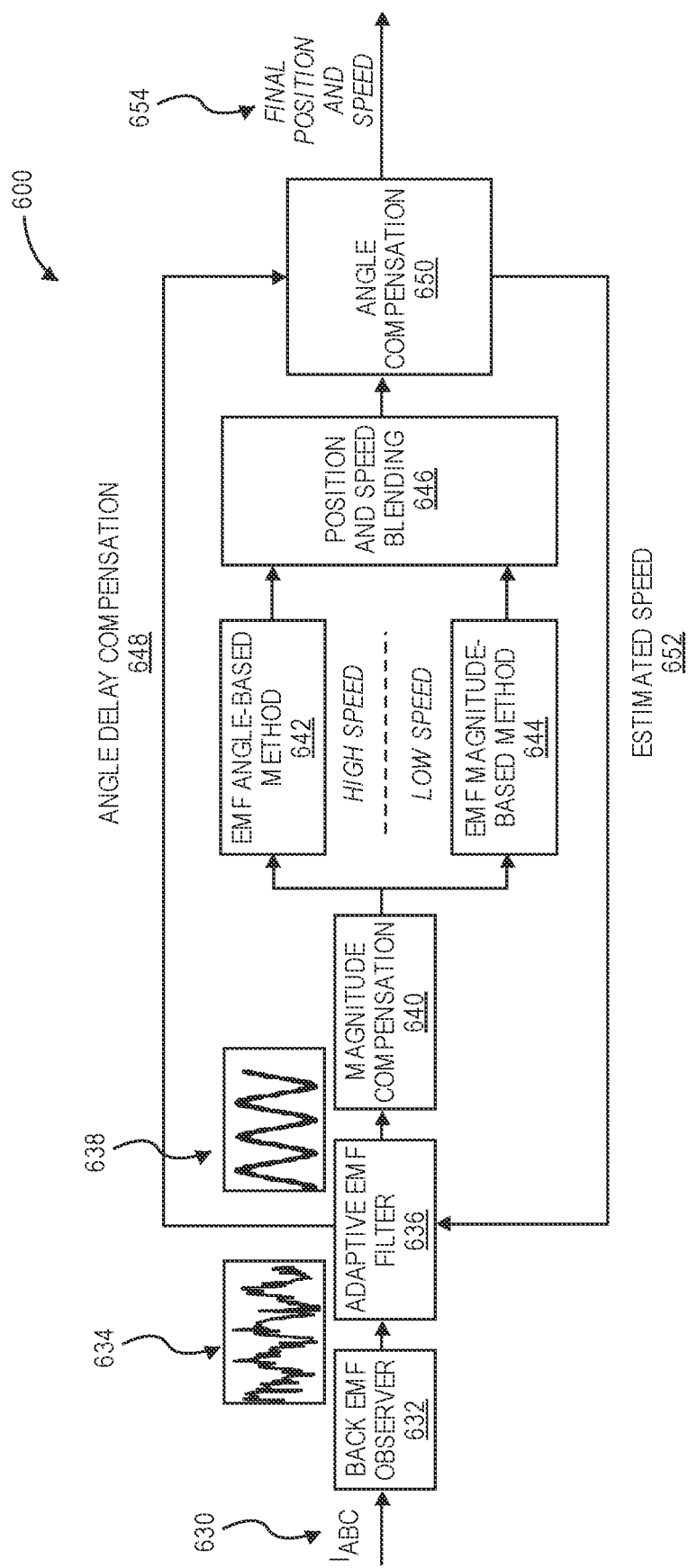
FIG. 6 is a block diagram of an example sensorless motor control at low speeds and speed reversals, in accordance with implementations of the present disclosure.

FIG. 6 is a block diagram 600 of an example sensorless motor control at low speeds and speed reversals, in accordance with implementations of the present disclosure.

As shown in FIG. 6, the systems and methods for sensorless motor control described herein may comprise a motor back EMF observer 632, an adaptive EMF filter 636, magnitude attenuation compensation 640, hybrid rotor position and speed determination 642, 644, rotor position and speed blending 646, and angle or phase delay compensation 650.

In example embodiments, the motor back EMF observer 632 may comprise a sliding mode observer, a model based observer, or other types of observer models, methods, or techniques to estimate motor back EMF. In some examples, sliding mode observer techniques that may be more immune to motor parameter deviations may be used. The back EMF observer 632 may receive a motor line current 630, e.g., labeled as IABc in FIG. 6, that may comprise an input current supplied to a motor or propulsion mechanism.

Based on the received motor line current 630, the back EMF observer 632 may generate an estimated motor back EMF signal 634. Generally, the estimated back EMF signal 634 may have a low signal-to-noise ratio for various speeds of the motor or propulsion mechanism. In addition, at low speeds and during speed reversals, the estimated back EMF signal 634 may suffer from an even lower signal-to-noise ratio. Because motor back EMF is a function of rotor speed, harmonics introduced by a motor controller during operation and/or switching may introduce noise that is particularly problematic at low speeds or during speed reversals. As a result, the estimated back EMF signal 634 may comprise a noisy back EMF signal.

In example embodiments, the adaptive EMF filter 636 may comprise a first-order filter, different order filters, or other types of filters having associated cutoff frequencies. In some examples, the adaptive EMF filter 636 may have a variable, adjustable, or configurable cutoff frequency that is based on one or more operating conditions of a motor or propulsion mechanism, such as speed or estimated speed of the motor or propulsion mechanism. The adaptive EMF filter 636 may receive the noisy estimated back EMF signal 634 from the back EMF observer 632.

Based on the received noisy estimated back EMF signal 634, the adaptive EMF filter 636 may generate a clean estimated motor back EMF signal 638. For example, the adaptive EMF filter 636 may filter the noisy estimated back EMF signal 634 based on an estimated speed 652 of the motor or propulsion mechanism, which may be received as feedback from later steps of the sensorless control method as further described herein. In some examples, one or more portions of the clean estimated motor back EMF signal 638 may also be filtered or estimated by using interpolation, with reference to lookup tables, and/or other similar techniques.

In addition to generating the clean estimated back EMF signal 638, the adaptive EMF filter 636 may also introduce, cause, or result in magnitude attenuation and/or angle or phase delay of the estimated back EMF signal. In order to provide more accurate and reliable rotor positions and speeds using the sensorless motor control methods described herein, the magnitude attenuation and/or phase delay may be compensated as further described herein. Because, however, the cutoff frequency of the adaptive EMF filter 636 may be adjusted, configured, or matched based on feedback of the estimated speed 652 of the motor or propulsion mechanism, the magnitude attenuation and/or phase delay may include substantially fixed or constant values across substantially all speed ranges of the motor or propulsion mechanism. Thus, the compensation of magnitude attenuation and/or phase delay may be simplified.

In example embodiments, the magnitude compensation 640 may comprise a processing block, or other signal compensation processes, methods, or techniques. As described herein, because the magnitude attenuation caused by the adaptive EMF filter 636 may be substantially known or expected, e.g., a substantially fixed or constant value across all speed ranges, the compensation of magnitude attenuation may be simplified. The magnitude compensation 640 may receive the clean estimated back EMF signal 638 from the adaptive EMF filter 636. Then, the magnitude compensation 640 may be configured to adjust or compensate the clean estimated back EMF signal 638 based on the known or expected magnitude attenuation caused by the adaptive EMF filter 636.

In example embodiments, the hybrid rotor position and speed determination may comprise an EMF angle-based method 642 to generate or determine a first rotor position and speed, and an EMF magnitude-based method 644 to generate or determine a second rotor position and speed. Generally, angle-based methods, processes, or techniques 642 to process back EMF signals may generate or determine rotor positions and speeds with greater accuracy and/or precision for higher speed ranges. In addition, magnitude-based methods, processes, or techniques 644 to process back EMF signals may generate or determine rotor positions and speeds with greater accuracy for lower speed ranges. The hybrid rotor position and speed determination may receive the clean estimated back EMF signal 638, e.g., following the magnitude compensation 640.

Angle-based methods 642 may process back EMF signals based on angle offsets associated with the back EMF signals, in order to generate or determine rotor positions and speeds. In addition, angled-based methods 642 may be more accurate and/or precise at higher speed ranges, e.g., at speed ranges greater than approximately 600 rpm, approximately 700 rpm, approximately 750 rpm, approximately 800 rpm, approximately 900 rpm, or above other speed thresholds or values.

Further, magnitude-based methods 644 may process back EMF signals based on magnitudes associated with the back EMF signals, e.g., a magnitude of a back EMF signal may be a function of or related to rotor speed, in order to generate or determine rotor positions and speeds. In addition, magnitude-based methods 644 may be more accurate at lower speed ranges, e.g., at speed ranges lower than approximately 500 rpm, approximately 400 rpm, approximately 300 rpm, approximately 200 rpm, or below other speed thresholds or values, and/or during speed reversals, e.g., zero crossings. Although more accurate at lower speed ranges and/or during speed reversals, magnitude-based methods 644 may be imprecise at such lower speed ranges and/or during speed reversals.

Based on the received clean estimated back EMF signal 638, e.g., following the magnitude compensation 640, the angle-based methods 642 may process the clean estimated back EMF signal 638 to generate or determine a first rotor position and speed, which may be more accurate and/or precise at higher speed ranges. In addition, the magnitude-based methods 644 may process the clean estimated back EMF signal 638 to generate or determine a second rotor position and speed, which may be more accurate at lower speed ranges.

In example embodiments, the rotor position and speed blending 646 may comprise a processing block, or other blending, shaping, or interpolation processes, methods, or techniques. For example, the rotor position and speed blending 646 may comprise a shaping function to blend the outputs from each of the angle-based method 642 and the magnitude-based method 644. In addition, the shaping function may smooth or blend transitions between the outputs from each of the angle-based method 642 and the magnitude-based method 644.

In some example embodiments, the shaping function may include a blending ratio or function related to the two outputs, which may be based on a coarse estimate of speed determined using the magnitude-based method 644. In addition or alternatively, the shaping function may comprise linear interpolation of the outputs from each of the angle-based method 642 and the magnitude-based method 644. Further, the shaping function may blend the outputs for substantially all speed ranges, for speed ranges between approximately 200 rpm and 900 rpm, between approximately 300 rpm and 800 rpm, between approximately 300 rpm and approximately 750 rpm, between approximately 400 rpm and 700 rpm, between approximately 500 rpm and 600 rpm, and/or for other speed ranges.

The rotor position and speed blending 646 may receive the first rotor position and speed generated using the angle-based method 642, and may also receive the second rotor position and speed generated using the magnitude-based method 644. Then, the first rotor position and speed may be blended or shaped with the second rotor position and speed to generate or determine a final estimated rotor position and speed.

In example embodiments, the angle or phase delay compensation 650 may comprise a processing block, or other signal compensation processes, methods, or techniques. As described herein, because the phase delay caused by the adaptive EMF filter 636 may be substantially known or expected, e.g., a substantially fixed or constant value across all speed ranges, the compensation of phase delay may be simplified. The angle or phase delay compensation 650 may receive the final estimated position and speed from the rotor position and speed blending 646.

In addition, the angle or phase delay compensation 650 may receive a feed forward angle or phase delay compensation value 648 from the adaptive EMF filter 636. Then, the angle or phase delay compensation 650 may be configured to adjust or compensate the final estimated rotor position and speed based on the known or expected phase delay caused by the adaptive EMF filter 636.

Furthermore, the final estimated speed 652, which may comprise one or more operating conditions of a motor or propulsion mechanism, may be provided as feedback to the adaptive EMF filter 636. Then, a cutoff frequency of the adaptive EMF filter 636 may be adjusted or configured based on the feedback of the final estimated speed 652. Thus, as described herein, the adaptive EMF filter 636 may generate the clean estimated motor back EMF signal 638 based on the estimated speed 652 of the motor or propulsion mechanism that is received as feedback following rotor position and speed blending 646 and angle or phase delay compensation 650.

Then, the final estimated rotor position and speed 654, e.g., following angle or phase delay compensation 650, may be generated or determined. In addition, the final estimated rotor position and speed 654 may be utilized to control the motor or propulsion mechanism, which may be associated with aerial vehicles, or other vehicles, machines, or systems.

Using the sensorless motor control systems and methods described herein, accurate and precise estimations of rotor positions and speeds of motors or propulsion mechanisms may be generated. For example, only a single input, e.g., input motor line current, may be required to generate the final estimated rotor position and speed. In addition, the adaptive EMF filter may simplify the compensation methods or techniques to arrive at the final estimated rotor position and speed. Further, the hybrid rotor position and speed determination, as well as rotor position and speed blending, may enable accurate and precise estimations across substantially all speed ranges, including at low speeds and during speed reversals or zero crossings. Moreover, the sensorless motor control systems and methods described herein may provide robust estimations even in the presence of non-negligible forces, loads, or torques, such as may be experienced by motors or propulsion mechanisms associated with aerial vehicles during various flight operations and/or under various environmental conditions.

Figure 7:
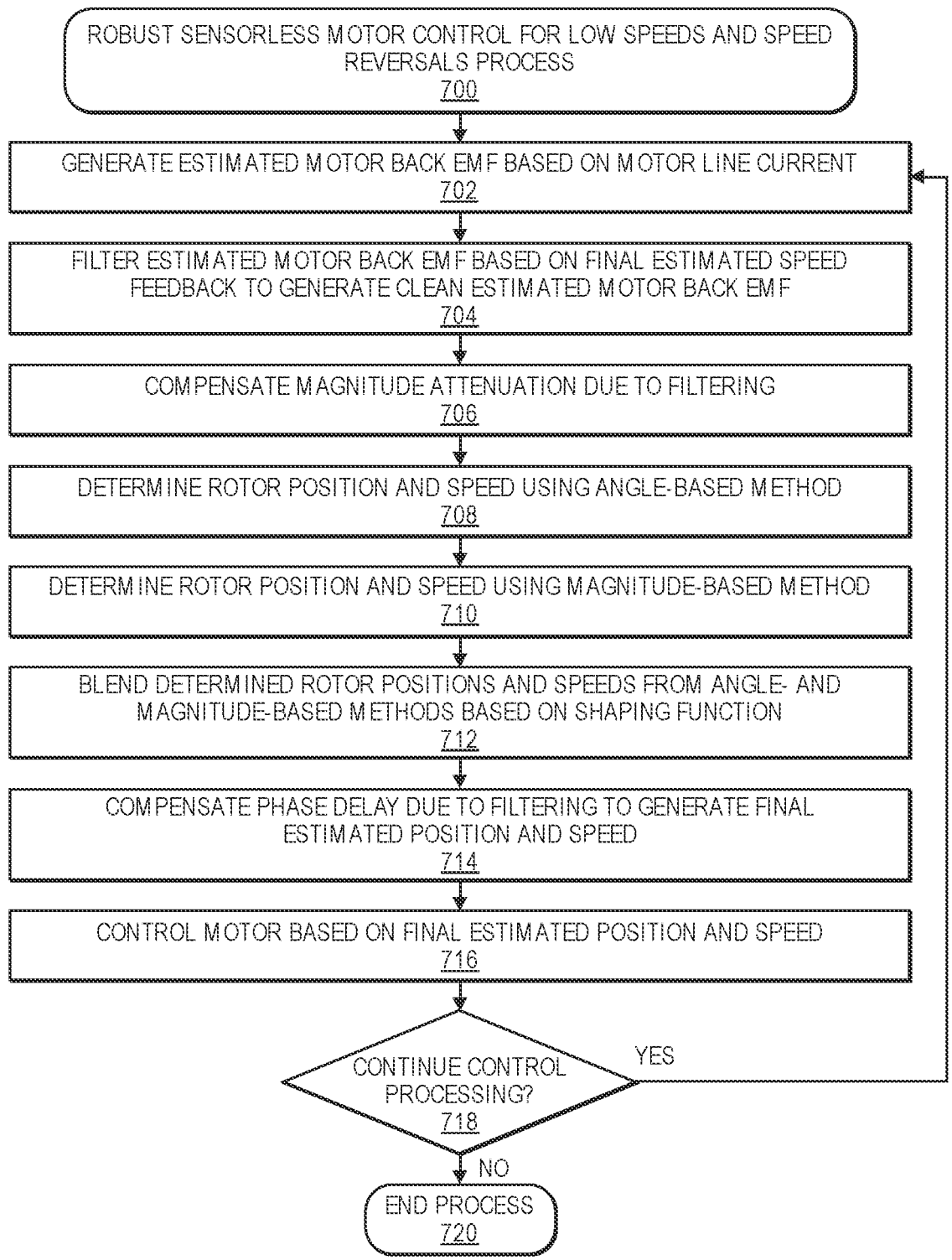
FIG. 7 is a flow diagram illustrating an example robust sensorless motor control for low speeds and speed reversals process, in accordance with implementations of the present disclosure.

FIG. 7 is a flow diagram illustrating an example robust sensorless motor control for low speeds and speed reversals process 700, in accordance with implementations of the present disclosure.

The process 700 may begin by generating an estimated motor back EMF signal based on a motor line current, as at 702. For example, a motor back EMF observer may receive and process an input motor line current provided to a motor or propulsion mechanism. The back EMF observer may generate an estimated back EMF signal based on the input motor line current. In addition, the estimated back EMF signal may have a low signal-to-noise ratio, particularly at low speeds or during speed reversals. Further, a controller may instruct or command generation of the estimated motor back EMF signal.

The process 700 may continue by filtering the estimated motor back EMF signal based on a final estimated speed feedback to generate a clean estimated motor back EMF signal, as at 704. For example, an adaptive EMF filter may receive, process, and/or filter the noisy estimated motor back EMF signal based on a cutoff frequency associated with the adaptive EMF filter. In some example embodiments, the adaptive EMF filter may have a cutoff frequency that is adjustable or configurable based on one or more operating conditions of a motor or propulsion mechanism, such as speed or estimated speed of the motor or propulsion mechanism. In addition, the estimated speed of the motor or propulsion mechanism may be received as feedback from later steps of the sensorless control method as further described herein. Moreover, the adaptive EMF filter may also introduce, cause, or result in magnitude attenuation and/or angle or phase delay of the estimated back EMF signal, which may be later compensated as further described herein. Further, a controller may instruct or command filtering of the estimated motor back EMF signal to generate a clean estimated motor back EMF signal.

The process 700 may then proceed by compensating a magnitude attenuation due to filtering, as at 706. For example, a magnitude compensation or processing block may receive the clean estimated back EMF signal generated by the adaptive EMF filter. In addition, the magnitude compensation or processing block may adjust or compensate the clean estimated back EMF signal based on the known or expected magnitude attenuation caused by the adaptive EMF filter. Further, a controller may instruct or command compensation of the magnitude attenuation due to filtering.

The process 700 may continue to determine rotor position and speed using an angle-based method, as at 708. For example, the angle-based method may receive the clean estimated back EMF signal following magnitude compensation, and process the clean estimated back EMF signal to generate or determine a first rotor position and speed. Generally, angle-based methods, processes, or techniques to process back EMF signals may generate or determine rotor positions and speeds with greater accuracy and/or precision for higher speed ranges. Further, a controller may instruct or command determination of rotor position and speed using an angle-based method.

The process 700 may proceed to determine rotor position and speed using a magnitude-based method, as at 710. For example, the magnitude-based method may receive the clean estimated back EMF signal following magnitude compensation, and process the clean estimated back EMF signal to generate or determine a second rotor position and speed. Generally, magnitude-based methods, processes, or techniques to process back EMF signals may generate or determine rotor positions and speeds with greater accuracy for lower speed ranges. Further, a controller may instruct or command determination of rotor position and speed using a magnitude-based method.

The process 700 may then continue with blending determined rotor positions and speeds from the angle- and magnitude-based methods based on a shaping function, as at 712. For example, a rotor position and speed blending, shaping, or processing block may receive the first rotor position and speed generated using the angle-based method, and may also receive the second rotor position and speed generated using the magnitude-based method. Then, the rotor position and speed blending, shaping, or processing block may blend or shape the first rotor position and speed with the second rotor position and speed to generate or determine a final estimated rotor position and speed, e.g., according to a shaping function. In some example embodiments, the shaping function may comprise a blending ratio or function, linear interpolation, or other types of shaping functions to blend the outputs from each of the angle- and magnitude-based methods. Further, a controller may instruct or command blending of the rotor positions and speeds from the angle- and magnitude-based methods.

The process 700 may proceed with compensating a phase delay due to filtering to generate the final estimated position and speed, as at 714. For example, an angle or phase delay compensation or processing block may receive the final rotor position and speed generated by the rotor position and speed blending, shaping, or processing block. In addition, the angle or phase delay value may be received as a feed forward compensation from the adaptive EMF filter as described herein. Moreover, the phase delay compensation or processing block may adjust or compensate the final rotor position and speed based on the known or expected angle or phase delay introduced or caused by the adaptive EMF filter. Further, a controller may instruct or command compensation of the phase delay due to filtering.

The process 700 may continue by controlling the motor based on the final estimated position and speed, as at 716. For example, a motor or propulsion mechanism of an aerial vehicle, or other vehicle, machine, or system may be controlled based on the final estimated position and speed following phase delay compensation. As described herein, the final estimated position and speed that is generated using the sensorless motor control systems and methods described herein may enable accurate and precise control of motors over substantially all speed ranges, including at low speeds and during speed reversals or zero crossings, as well as provide robust estimations even in the presence of non-negligible forces, loads, or torques, such as may be experienced by motors or propulsion mechanisms associated with aerial vehicles during various flight operations and/or under various environmental conditions. Further, a controller may instruct or command controlling of a motor or propulsion mechanism based on the final estimated position and speed.

The process 700 may then proceed by determining whether to continue control processing, as at 718. For example, it may be determined whether to continue control processing for the same motor or propulsion mechanism, and/or for one or more other motors or propulsion mechanisms associated with a vehicle, machine, or system. Further, a controller may determine whether to continue control processing. If it is determined to continue control processing, the process 700 may return to step 702 to repeat the process for one or more motors or propulsion mechanisms.

If, however, it is determined not to continue control processing, the process 700 may then end, as at 720.

Figure 8:
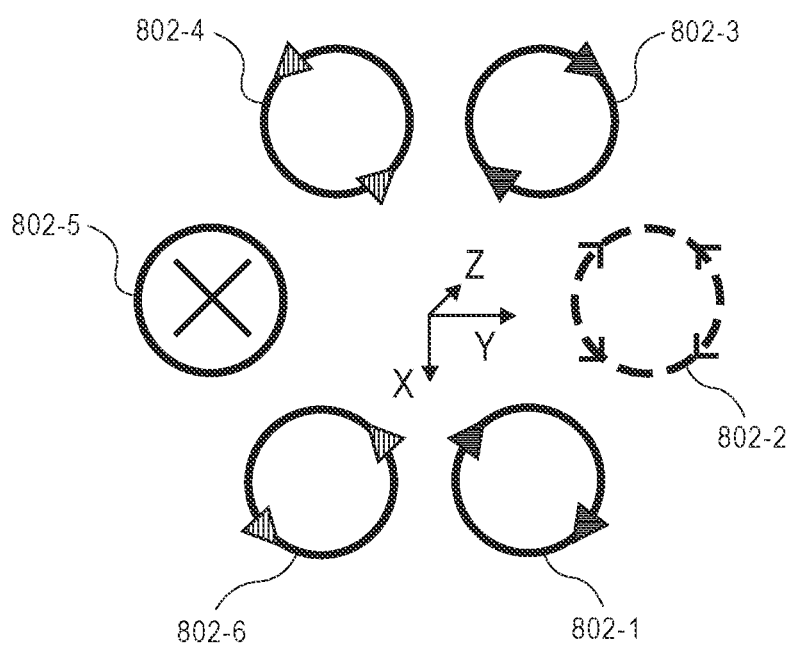
FIG. 8 illustrates a schematic diagram of an example sensorless motor control for low speeds and speed reversals of an aerial vehicle in a degraded operational state, in accordance with implementations of the present disclosure.

FIG. 8 illustrates a schematic diagram of an example sensorless motor control for low speeds and speed reversals of an aerial vehicle in a degraded operational state, in accordance with implementations of the present disclosure.

FIG. 8 schematically shows an aerial vehicle having a configuration similar to that described with respect to FIGS. 1-5. The example of FIG. 8 may be a top view of an aerial vehicle in a VTOL orientation. The aerial vehicle may include six propulsion mechanisms 802-1, 802-2, 802-3, 802-4, 802-5, and 802-6. One of the propulsion mechanisms, e.g., 802-5, may have failed or experienced one or more faults as described herein, such that the aerial vehicle is in a motor out situation. In addition, responsive to the motor out situation, a propulsion mechanism 802-2 opposite the failed propulsion mechanism 802-5 may be instructed to implement the sensorless motor control methods described herein. As a result, the aerial vehicle may be operating primarily with four propulsion mechanisms 802-1, 802-3, 802-4, and 802-6 responsive to the motor out situation, and an additional propulsion mechanism 802-2 may be utilized to maintain stable and reliable flight operations of the aerial vehicle as needed.

As shown in FIG. 8, the aerial vehicle that is experiencing the motor out situation may have coupled moments and/or coupled forces due to the rotational directions of the remaining four propulsion mechanisms 802-1, 802-3, 802-4, and 802-6 that are operational. That is, in the degraded operation of the aerial vehicle, the rotational directions of the propulsion mechanisms 802-1 and 802-3 that are now adjacent each other may be in a same direction, e.g., a first direction, and the rotational directions of the propulsion mechanisms 802-4 and 802-6 that are also now adjacent each other may also be in a same direction, e.g., a second direction. As a result, the additional propulsion mechanism 802-2 may need to be operated in particular and variable ways in order to maintain stability and reliable navigation of the aerial vehicle, in response to the motor out situation.

For example, in response to the motor out situation, the additional propulsion mechanism 802-2 may need to be operated over a wide range of speeds, including very low speed ranges and very high speed ranges to maintain stability and reliable navigation of the aerial vehicle. In addition, the additional propulsion mechanism 802-2 may need to consistently and accurately maintain low speeds over durations of time to maintain stability and reliable navigation of the aerial vehicle. Further, the additional propulsion mechanism 802-2 may need to perform multiple or repeated speed reversals or zero crossings to maintain stability and reliable navigation of the aerial vehicle, as indicated by the opposing arrows associated with the additional propulsion mechanism 802-2 illustrated in FIG. 8. Moreover, the additional propulsion mechanism 802-2 may need to be operated over wide and variable speed ranges, at low speeds, and/or during speed reversals in the presence of non-negligible forces, loads, or torques during various flight operations and/or under various environmental conditions.

Thus, the sensorless motor control systems and methods described herein may be implemented or utilized to control operations of the additional propulsion mechanism 802-2 in response to motor out situations. Because the additional propulsion mechanism 802-2 may need to be operated over wide and variable speed ranges, at low speeds, and/or during speed reversals, the sensorless motor control systems and methods described herein may provide more accurate and reliable estimations of final rotor positions and speeds, in order to enable more accurate and reliable navigation and flight of the aerial vehicle.

In further example embodiments, one or more other propulsion mechanisms, e.g., one or more of the remaining four propulsion mechanisms 802-1, 802-3, 802-4, and 802-6, may also need to be operated in particular and variable ways in order to maintain stability and reliable navigation of the aerial vehicle, in response to the motor out situation. Thus, the sensorless motor control systems and methods described herein may be implemented or utilized to control operations of one or more of the remaining four propulsion mechanisms 802-1, 802-3, 802-4, and 802-6 as well, thereby ensuring safe, stable, and reliable navigation and operations of the aerial vehicle in response to motor out situations.

Figure 9:
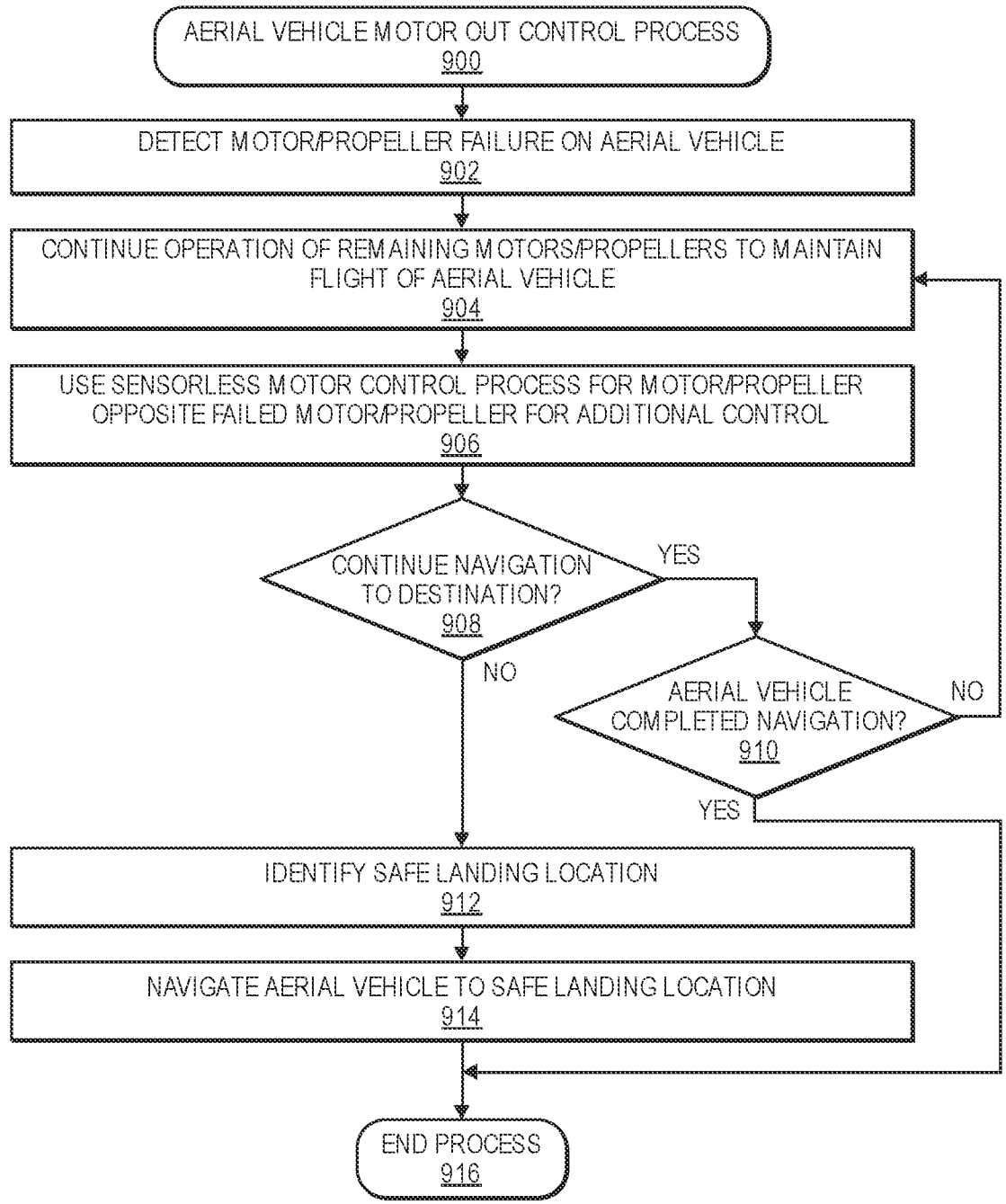
FIG. 9 is a flow diagram illustrating an example aerial vehicle motor out control process, in accordance with implementations of the present disclosure.

FIG. 9 is a flow diagram illustrating an example aerial vehicle motor out control process 900, in accordance with implementations of the present disclosure.

The process 900 may begin by detecting a motor/propeller failure on an aerial vehicle, as at 902. For example, the motor/propeller failure may be a propulsion mechanism failure. In addition, the detected failure may be any of the various types of faults that may result in motor out situations, as described herein. Further, a control system may detect the motor/propeller failure on the aerial vehicle.

The process 900 may then continue operation of remaining motors/propellers to maintain flight of the aerial vehicle, as at 904. For example, the propulsion mechanism having the associated motor/propeller failure may be stopped, turned off, or otherwise removed from operation. In addition, the remaining propulsion mechanisms of the aerial vehicle, e.g., remaining five propulsion mechanisms of an aerial vehicle having six total propulsion mechanisms, may be used to continue operations and maintain flight of the aerial vehicle. Further, a control system may instruct or command continued operation of the remaining motors/propellers to maintain flight of the aerial vehicle.

The process 900 may then proceed by using the sensorless motor control process for a motor/propeller opposite the failed motor/propeller for additional control, as at 906. For example, responsive to the motor out situation, the aerial vehicle may implement or utilize the sensorless motor control systems and methods described herein to control operation of the additional propulsion mechanism that is opposite the failed propulsion mechanism of the aerial vehicle. Because the additional propulsion mechanism may need to be operated over wide and variable speed ranges, at low speeds, and/or during speed reversals in the presence of non-negligible forces, loads, or torques, the sensorless motor control systems and methods described herein may provide more accurate and reliable estimations of final rotor positions and speeds, in order to enable more accurate and reliable navigation and flight of the aerial vehicle. In further example embodiments, one or more other propulsion mechanisms of the aerial vehicle may also implement or utilize the sensorless motor control systems and methods described herein, in order to enable more accurate and reliable navigation and flight of the aerial vehicle. Further, a control system may instruct or command operations of the additional propulsion mechanism utilizing the sensorless motor control systems and methods described herein.

The process 900 may continue to determine whether to continue navigation to a destination, as at 908. For example, it may be determined whether safe, stable, and reliable navigation may be maintained for a duration of a navigation path to a destination. Further, a control system may determine whether implementing the sensorless motor control systems and methods for one or more propulsion mechanisms of the aerial vehicle may enable stable and reliable flight operations for continued navigation to a destination.

If safe, stable, and reliable navigation may be maintained, the process 900 may proceed to determine whether the aerial vehicle has completed navigation, as at 910. For example, upon reaching the destination, the aerial vehicle may have completed its navigation. In addition, upon performing one or more tasks or operations at the destination, the aerial vehicle may have completed its navigation. In some example embodiments, the aerial vehicle may navigate to an origin or other location, e.g., a takeoff location, a material handling facility, a delivery location, a landing location, or other location, in order to complete its navigation. Further, a control system may determine whether the aerial vehicle has completed navigation.

If the aerial vehicle has not yet completed navigation, the process 900 may return to step 904 to continue operation of the remaining motors/propellers, while also implementing or utilizing the sensorless motor control systems and methods for one or more propulsion mechanisms, until it is determined that the aerial vehicle is no longer to continue navigation to the destination, as at 908, or that the aerial vehicle has completed the navigation, as at 910.

If, however, it is determined at step 908 that safe, stable, and reliable navigation may not be maintained, the process 900 may continue with identifying a safe landing location, as at 912. For example, the safe landing location may be predetermined and stored by or provided to the aerial vehicle. Various safe landing locations may be identified and stored beforehand, and the aerial vehicle may identify a closest available safe landing location responsive to the motor out situation. In other examples, the aerial vehicle may use one or more sensors, such as imaging devices, radar, LIDAR (light detection and ranging), proximity sensors, inertial measurement units, navigation sensors such as global positioning sensors, and/or other types of sensors, to identify a safe landing location responsive to the motor out situation. Various other types of beacons, communication devices, or other sensors may also be used to identify a safe landing location for the aerial vehicle. Further, a control system may instruct or command identification of a safe landing location.

The process 900 may then proceed with navigating the aerial vehicle to the safe landing location, as at 914. For example, the aerial vehicle may implement the sensorless motor control systems and methods for one or more remaining propulsion mechanisms, and the aerial vehicle may navigate to the identified safe landing location using one or more sensors, such as imaging devices and navigation sensors. Further, a control system may instruct or command navigation of the aerial vehicle to a safe landing location.

Upon reaching the safe landing location at step 914, and/or responsive to determining that the aerial vehicle has completed navigation at step 910, the process 900 may then end, as at 916.

Figure 10:
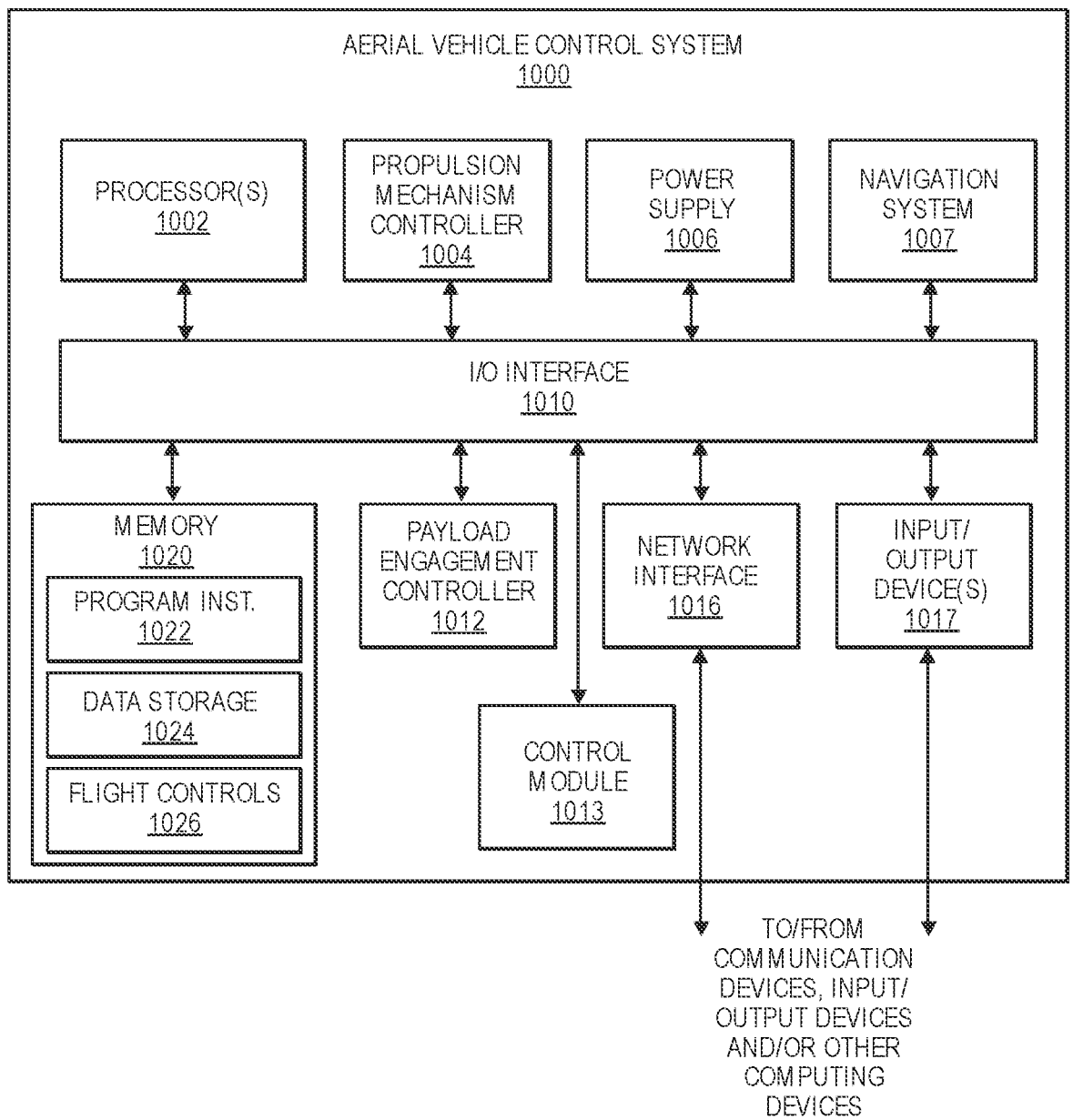
FIG. 10 is a block diagram illustrating various components of an example aerial vehicle control system, in accordance with implementations of the present disclosure.

FIG. 10 is a block diagram illustrating various components of an example aerial vehicle control system 1000, in accordance with implementations of the present disclosure.

In various examples, the block diagram may be illustrative of one or more aspects of the aerial vehicle control system 1000 that may be used to implement the various systems and methods discussed herein and/or to control operation of an aerial vehicle discussed herein. In the illustrated implementation, the aerial vehicle control system 1000 includes one or more processors 1002, coupled to a memory, e.g., a non-transitory computer readable storage medium 1020, via an input/output (I/O) interface 1010. The aerial vehicle control system 1000 also includes propulsion mechanism controller(s) 1004, such as electronic speed controls (ESCs) or motor controllers, power modules 1006 and/or a navigation system 1007. The aerial vehicle control system 1000 further includes a payload engagement controller 1012, a control module 1013 configured to implement the sensorless motor control systems and methods described herein, a network interface 1016, and one or more input/output devices 1017.

In various implementations, the aerial vehicle control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths, flight control parameters, and/or data items accessible by the processor(s) 1002. In various implementations, the non-transitory computer readable storage medium 1020 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022, data storage 1024 and flight controls 1026, respectively. In other implementations, program instructions, data, and/or flight controls may be received, sent, or stored upon different types of computer-accessible media, such as non-transitory media, or on similar media separate from the non-transitory computer readable storage medium 1020 or the aerial vehicle control system 1000. Generally speaking, a non-transitory, computer readable storage medium may include storage media or memory media such as magnetic or optical media, e.g., disk or CD/DVD-ROM, coupled to the aerial vehicle control system 1000 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface 1016 or other peripheral interfaces, such as input/output devices 1017. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propulsion mechanism controllers 1004 may communicate with the navigation system 1007 and adjust the rotational speed, rotational direction, or other parameters of each propulsion mechanism to implement the sensorless motor control systems and methods, to stabilize and maintain flight of the aerial vehicle, and/or to perform one or more maneuvers and guide the aerial vehicle along a flight path and/or to a safe landing location.

The navigation system 1007 may include a global positioning system (GPS), indoor positioning system (IPS), or other similar system and/or sensors that can be used to navigate the aerial vehicle to and/or from a location. The payload engagement controller 1012 communicates with the actuator(s) or motor(s) (e.g., a servo motor) used to engage and/or disengage items.

The control module 1013 may comprise or form a part of a flight controller that is configured to implement the sensorless motor control systems and methods described herein, by generating accurate and reliable estimations of rotor positions and speeds, over wide and variable speed ranges, at low speeds, during speed reversals, and/or in the presence of non-negligible forces, loads, or torques, such that the motors and/or propulsion mechanisms may be more accurately and reliably controlled to maintain safe and stable flight operations. The control module 1013 may send and/or receive data to/from one or more sensors, such as imaging devices, an inertial measurement unit, accelerometers, gyroscopes, navigation sensors, or other sensors, and/or the control module 1013 may send and/or receive data to/from propulsion mechanism controllers 1004 associated with respective propulsion mechanisms. In some example embodiments, the control module 1013 may be integrated with or form a part of one or more of the processors 1002, the propulsion mechanism controllers 1004, and/or the navigation system 1007.

The network interface 1016 may be configured to allow data to be exchanged between the aerial vehicle control system 1000, other devices attached to a network, such as other computer systems (e.g., remote computing resources), and/or with aerial vehicle control systems of other aerial vehicles. For example, the network interface 1016 may enable wireless communication between the aerial vehicle and an aerial vehicle control system that is implemented on one or more remote computing resources. For wireless communication, an antenna of the aerial vehicle or other communication components may be utilized. As another example, the network interface 1016 may enable wireless communication between numerous aerial vehicles. In various implementations, the network interface 1016 may support communication via wireless general data networks, such as a Wi-Fi network. For example, the network interface 1016 may support communication via telecommunications networks, such as cellular communication networks, satellite networks, and the like.

Input/output devices 1017 may, in some implementations, include one or more displays, imaging devices, thermal sensors, infrared sensors, time of flight sensors, accelerometers, pressure sensors, weather sensors, etc. Multiple input/output devices 1017 may be present and controlled by the aerial vehicle control system 1000. One or more of these sensors may be utilized to implement the sensorless motor control systems and methods described herein, as well as to detect failures or faults, identify safe landing locations, and/or perform any other operations or functions described herein.

As shown in FIG. 10, the memory may include program instructions 1022, which may be configured to implement the example routines and/or sub-routines described herein. The data storage 1024 may include various data stores for maintaining data items that may be provided for implementing the sensorless motor control systems and methods, as well as determining flight paths, detecting motor/propeller failures, identifying safe landing locations, determining which propulsion mechanisms to implement or utilize the sensorless motor control systems and methods, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1000 is merely illustrative and is not intended to limit the scope of the present disclosure. In particular, the computing system and devices may include any combination of hardware or software that can perform the indicated functions. The aerial vehicle control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to aerial vehicles, the disclosed implementations may also be used for other forms of vehicles, including, but not limited to, ground-based vehicles and water-based vehicles. For example, in further example embodiments, the sensorless motor control systems and methods may be implemented or utilized for various other types of applications, such as steer-by-wire or fly-by-wire applications in various types of vehicles operating in various types of environments.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 7 and 9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method for sensorless control of a motor of an aerial vehicle, comprising:
   processing, using a back EMF (electromotive force) observer, an input motor current provided to a motor to generate a noisy estimated motor back EMF signal;
   filtering, using an adaptive filter, the noisy estimated motor back EMF signal based on an estimated speed associated with the motor to generate a clean estimated motor back EMF signal, wherein the filtering introduces a magnitude attenuation and a phase shift to the clean estimated motor back EMF signal;
   compensating the clean estimated motor back EMF signal based on the magnitude attenuation;
   processing, using an angle-based method, the clean estimated motor back EMF signal to determine a first rotor position and a first rotor speed associated with the motor;
   processing, using a magnitude-based method, the clean estimated motor back EMF signal to determine a second rotor position and a second rotor speed associated with the motor;
   blending the first rotor position and the second rotor position based on a shaping function to generate a combined estimated rotor position;
   blending the first rotor speed and the second rotor speed based on the shaping function to generate a combined estimated rotor speed;
   compensating the combined estimated rotor position and the combined estimated rotor speed based on the phase shift to generate a final estimated rotor position and a final estimated rotor speed; and
   controlling the motor of the aerial vehicle based on the final estimated rotor position and the final estimated rotor speed.

2. The method of claim 1, wherein the method generates accurate values for the final estimated rotor position and the final estimated rotor speed of the motor of the aerial vehicle during speed reversals or at low speeds less than approximately 1000 rpm.

3. The method of claim 1, wherein the method generates accurate values for the final estimated rotor position and the final estimated rotor speed of the motor of the aerial vehicle subject to non-negligible external forces or loads.

4. The method of claim 1, wherein the angle-based method generates accurate and precise values for the first rotor position and the first rotor speed at higher speed ranges above approximately 900 rpm; and
   wherein the magnitude-based method generates accurate values for the second rotor position and the second rotor speed at lower speed ranges below approximately 200 rpm and during speed reversals.

5. The method of claim 1, wherein shaping function comprises linear interpolation.

6. A method, comprising:
   filtering, using an adaptive filter, a noisy estimated back EMF (electromotive force) signal based on an estimated speed associated with a motor to generate a clean estimated back EMF signal;
   processing, using an angle-based method, the clean estimated back EMF signal to determine a first position and first speed associated with a rotor of the motor;

processing, using a magnitude-based method, the clean estimated back EMF signal to determine a second position and second speed associated with the rotor of the motor;

blending the first position and first speed with the second position and second speed based on a shaping function to generate a final estimated position and final estimated speed; and controlling the motor based on the final estimated position and final estimated speed.

7. The method of claim 6, further comprising:

processing, using a back EMF (electromotive force) observer, an input motor current provided to the motor to generate the noisy estimated back EMF signal.

8. The method of claim 6, wherein the filtering introduces a magnitude attenuation and a phase shift to the clean estimated back EMF signal; and the method further comprising:
compensating the clean estimated back EMF signal based on the magnitude attenuation; and
compensating the final estimated position and final estimated speed based on the phase shift.

9. The method of claim 8, wherein the final estimated speed is provided as feedback to the adaptive filter as the estimated speed associated with the motor; and wherein the phase shift from the adaptive filter is provided as a feed forward compensation.

10. The method of claim 6, wherein the adaptive filter comprises a first-order filter including a cutoff frequency that varies based on the estimated speed associated with the motor.

11. The method of claim 6, wherein the angle-based method generates accurate and precise values for the first position and first speed at higher speed ranges above approximately 700 rpm; and wherein the magnitude-based method generates accurate values for the second position and second speed at lower speed ranges below approximately 400 rpm and during speed reversals.

12. The method of claim 11, wherein the first position and first speed are blended with the second position and second speed for speed ranges between approximately 400 rpm and approximately 700 rpm.

13. The method of claim 6, wherein the first position and first speed are blended with the second position and second speed for substantially all speed ranges.

14. The method of claim 6, wherein the shaping function comprises linear interpolation.

15. The method of claim 14, wherein the linear interpolation comprises a blending ratio based on the second speed determined using the magnitude-based method.

16. A method to control an aerial vehicle, comprising:

detecting a failure of a first propulsion mechanism, the aerial vehicle comprising six propulsion mechanisms associated with six propellers;

responsive to the detected failure, implementing sensorless control for a second propulsion mechanism that is positioned opposite to the first propulsion mechanism, the sensorless control further comprising:

filtering, using an adaptive filter, a noisy estimated back EMF (electromotive force) signal based on an estimated speed associated with the second propulsion mechanism to generate a clean estimated back EMF signal;

processing, using an angle-based method, the clean estimated back EMF signal to determine a first position and first speed associated with a rotor of the second propulsion mechanism;

processing, using a magnitude-based method, the clean estimated back EMF signal to determine a second position and second speed associated with the rotor of the second propulsion mechanism;

blending the first position and first speed with the second position and second speed based on a shaping function to generate a final estimated position and final estimated speed; and controlling the second propulsion mechanism based on the final estimated position and final estimated speed;

identifying a safe landing location for the aerial vehicle; and navigating the aerial vehicle to the safe landing location.

17. The method of claim 16, further comprising:

responsive to the detected failure, implementing the sensorless control for at least one additional propulsion mechanism of the six propulsion mechanisms of the aerial vehicle.

18. The method of claim 16, wherein the adaptive filter comprises a first-order filter including a cutoff frequency that varies based on the estimated speed associated with the second propulsion mechanism.

19. The method of claim 16, wherein the angle-based method generates accurate and precise values for the first position and first speed at higher speed ranges above approximately 800 rpm; and wherein the magnitude-based method generates accurate values for the second position and second speed at lower speed ranges below approximately 300 rpm and during speed reversals.

20. The method of claim 16, wherein the shaping function comprises linear interpolation; and wherein the first position and first speed are blended with the second position and second speed for substantially all speed ranges.

\* \* \* \* \*